United States Patent
Nagashima

(10) Patent No.: US 10,698,841 B2
(45) Date of Patent: Jun. 30, 2020

(54) SEMICONDUCTOR STORAGE DEVICE, MEMORY CONTROLLER, AND METHOD FOR MONITORING MEMORY

(71) Applicant: LAPIS Semiconductor Co., Ltd., Yokohama (JP)

(72) Inventor: Yuji Nagashima, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 232 days.

(21) Appl. No.: 15/974,642

(22) Filed: May 8, 2018

(65) Prior Publication Data
US 2018/0329766 A1 Nov. 15, 2018

(30) Foreign Application Priority Data
May 15, 2017 (JP) ................. 2017-096462

(51) Int. Cl.
G06F 12/14 (2006.01)
G06F 11/10 (2006.01)

(52) U.S. Cl.
CPC ...... *G06F 12/1408* (2013.01); *G06F 11/1004* (2013.01)

(58) Field of Classification Search
CPC .............. G06F 11/1004; G06F 12/1408
See application file for complete search history.

(56) References Cited

U.S. PATENT DOCUMENTS

| | | | | |
|---|---|---|---|---|
| 8,417,887 B2* | 4/2013 | Miwa | .................... | G06F 3/0605 |
| | | | | 711/114 |
| 9,417,951 B2* | 8/2016 | Adikari | .................... | G06F 11/10 |
| 2016/0321194 A1* | 11/2016 | Takada | ................ | G06F 12/1408 |
| 2016/0344428 A1* | 11/2016 | Wang | ...................... | G09C 1/00 |

FOREIGN PATENT DOCUMENTS

JP 2008-052360 A 3/2008

* cited by examiner

*Primary Examiner* — Joseph R Kudirka
(74) *Attorney, Agent, or Firm* — Rabin & Berdo, P.C.

(57) ABSTRACT

A memory controller includes: a memory access part which writes, to memory, an encrypted data acquired by encrypting information data, a first code for error detection based on the information data, and a second code for error detection based on the encrypted data and which reads the encrypted data, the first and second codes from the memory during a monitoring process being executed with a monitoring part; a decryption part for acquiring readout data by decrypting the encrypted data; and an error detection part which acquires a first error detection result by performing an error detection process on the readout data and the first code and a second error detection result by performing an error detection process on the encrypted data and the second code. The monitoring part stops the decryption part during the monitoring process and determines a deterioration level of memory based on the second error detection result.

11 Claims, 3 Drawing Sheets

SEMICONDUCTOR STORAGE DEVICE, MEMORY CONTROLLER, AND METHOD FOR MONITORING MEMORY

BACKGROUND OF THE INVENTION

1. Field of the Invention

The present invention relates to a semiconductor storage device, a memory controller for controlling a memory, and a method for monitoring the memory.

2. Description of the Related Art

Recently suggested are storage devices which encrypt information data to be protected and then store the resulting data in a disk in order to protect secret data (for example, see Japanese Patent Application Laid-Open No. 2008-52360).

Such a storage device stores encrypted data in the disk in conjunction with the information data, the encrypted data being acquired by encrypting an error detection Cyclic Redundancy Check (CRC) code added to the information data, for example, using an encryption key.

To acquire the information data stored in the storage device, the encrypted data is read from the disk and then a decryption process for canceling encryption is performed on the read encrypted data, thereby decrypting the information data and the CRC code. The storage device performs an error detection process on the information data and the CRC code, so that when no error is detected, this information data is outputted as readout data.

SUMMARY OF THE INVENTION

On the other hand, it is also conceivable that the data encrypted as described above may not be stored in the disk but, for example, in a nonvolatile semiconductor memory such as a NAND type flash memory.

The NAND type flash memory performs the memory monitoring to monitor the deterioration level of the storage region of the memory in addition to a typical data readout in response to an external readout access.

In this memory monitoring, data (for example, including a CRC code as an error detection code) is read in pages on each block of the NAND type flash memory. At this time, when the stored data has been encrypted as described above, readout data with the encryption canceled is acquired by decrypting the encrypted data that has been read out.

On the basis of the error detection result acquired by performing the error detection process on the readout data, the deterioration level of the storage region in which the readout data was stored is determined. Thus, since writing the encrypted data on a nonvolatile semiconductor memory is to perform a decryption process for canceling encryptions each time the aforementioned memory monitoring is performed, this leads to an increase in the amount of power consumption and time for monitoring.

It is therefore an object of the present invention to provide a semiconductor storage device, a memory controller, and a method for monitoring a memory which are capable of reducing the time spent for monitoring the memory and the amount of power consumption.

A semiconductor storage device according to the present invention includes a memory, and a memory controller configured to control the memory in response to a write command or readout command. The memory controller includes: a monitoring part configured to intermittently execute monitoring processes each for monitoring a deterioration level of the memory corresponding to a count of errors having occurred in a data piece read from the memory; a memory access part configured to write, to the memory upon reception of the write command, an encrypted data piece into which an information data piece to be written is encrypted, a first code for error detection based on the information data piece, and a second code for error detection based on the encrypted data piece, and to read the encrypted data piece, the first code, and the second code from the memory upon reception of the readout command or during the monitoring process being executed; a decryption part configured to acquire a readout data piece of which encryption has been canceled by decrypting the encrypted data piece read from the memory; and an error detection part configured to acquire a first error detection result by performing an error detection process on the readout data piece and the first code read from the memory and to acquire a second error detection result by performing an error detection process on the encrypted data piece and the second code read from the memory. The monitoring part stops the operation of the decryption part during the monitoring process being executed and determines the deterioration level on the basis of the second error detection result.

A memory controller according to the present invention controls a memory in response to a write command or readout command. The memory controller includes: a monitoring part configured to intermittently execute monitoring processes each for monitoring a deterioration level of the memory corresponding to a count of errors having occurred in a data piece read from the memory; a memory access part configured to write, to the memory upon reception of the write command, an encrypted data piece into which an information data piece to be written is encrypted, a first code for error detection based on the information data piece, and a second code for error detection based on the encrypted data piece, and to read the encrypted data piece, the first code, and the second code from the memory upon reception of the readout command or during the monitoring process being executed; a decryption part configured to acquire a readout data piece of which encryption has been canceled by decrypting the encrypted data piece read from the memory; and an error detection part configured to acquire a first error detection result by performing an error detection process on the readout data piece and the first code read from the memory and to acquire a second error detection result by performing an error detection process on the encrypted data piece and the second code read from the memory. The monitoring part stops the operation of the decryption part during the monitoring process being executed and determines the deterioration level on the basis of the second error detection result.

A method for monitoring a memory according to the present invention intermittently executes monitoring processes each for monitoring a deterioration level of the memory corresponding to a count of errors having occurred in a data piece read from the memory in which an encrypted data piece into which an information data piece to be written is encrypted, a first code for error detection based on the information data piece, and a second code for error detection based on the encrypted data piece are stored. The method for monitoring a memory includes: reading, upon reception of a readout command or during the monitoring process being executed, the encrypted data piece, the first code, and the second code from the memory; acquiring a readout data piece of which encryption has been canceled by performing a decryption process on the encrypted data piece read from the memory; acquiring a first error detection result by performing an error detection process on the readout data piece and the first code read from the memory; and acquiring a second error detection result by performing an error detection process on the encrypted data piece and the second code read from the memory. During the monitoring process being executed, the decryption process is stopped and the deterioration level is determined on the basis of the second error detection result.

According to the present invention, when an information data piece is encrypted and written to a memory, the first code for error detection based on the information data piece and a second code for error detection based on the encrypted data piece are written in conjunction with the encrypted data piece into which the information data piece is encrypted. Upon reception of a readout command or during execution of a monitoring process for monitoring the deterioration level of the memory, the encrypted data piece, and the first and second codes are read from the memory.

The readout data piece of which encryption has been canceled by decrypting the encrypted data piece read from the memory is acquired. Then, the first error detection result is acquired by performing the error detection process on the readout data piece and the first code read from the memory, and the second error detection result is acquired by performing the error detection process on the encrypted data piece and the second code read from the memory. During execution of a monitoring process for monitoring the deterioration level of the memory, the aforementioned decryption process is stopped and the deterioration level of the memory is determined on the basis of the second error detection result.

Therefore, according to the present invention, since the amount of power consumption spent for the decryption process is substantially zero during monitoring of the memory, it is possible to reduce the amount of power consumption in the semiconductor storage device. Furthermore, according to the aforementioned monitoring process, the error detection process can be performed on the encrypted data piece and the second code read from the memory without waiting for the time spent for the decryption process. It is thus possible to shorten the time spent for the monitoring process.

DETAILED DESCRIPTION OF THE INVENTION

A description will now be given of an embodiment of the present invention in more detail with reference to the drawings.

Figure 1:
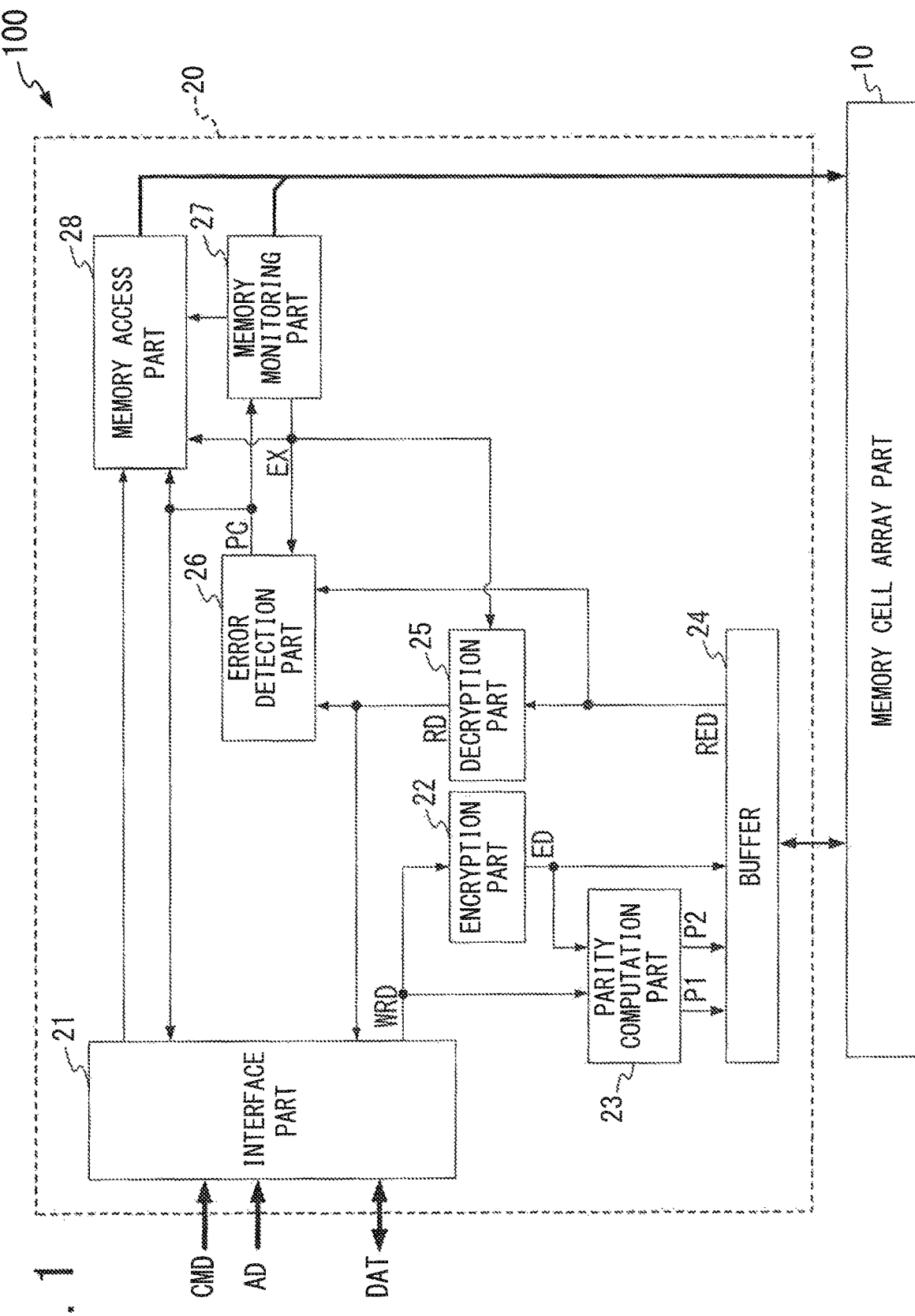
FIG. 1 is a block diagram illustrating a configuration of a semiconductor storage device 100 according to the present invention.

FIG. 1 is a block diagram illustrating a configuration of a semiconductor storage device 100 according to the present invention. As shown in FIG. 1, the semiconductor storage device 100 has a memory cell array part 10 and a memory controller 20.

For example, the memory cell array part 10 includes a memory cell array including a plurality of NAND type memory cells, and a driver for applying various types of voltages to the memory cell array for writing or reading data. The memory cell array has a page constituted by a plurality of memory cells as the minimum access part, and a plurality of pages constitute a block.

The memory controller 20 includes an interface part 21, an encryption part 22, a parity computation part 23, a buffer 24, a decryption part 25, an error detection part 26, a memory monitoring part 27, and a memory access part 28.

The interface part 21 receives various types of commands (for example, a readout command, a write command) sent out from a host device (not illustrated), an address AD, and information data DAT.

For example, upon reception of a write command for prompting writing of data, an address AD, and information data DAT to be written, the interface part 21 supplies the information data DAT as write data WRD to the encryption part 22 and the parity computation part 23. Furthermore, the interface part 21 supplies, to the memory access part 28, a write access signal for prompting writing of the write data WRD to the address AD.

Upon reception of the readout command for prompting reading of data and the address AD, the interface part 21 supplies, to the memory access part 28, a readout access signal for prompting reading of data stored at the address AD. Furthermore, in response to the readout access signal, the interface part 21 outputs, as the information data DAT, readout data RD that has been read from the memory cell array part 10 and subsequently decrypted at the decryption part 25. However, on the other hand, when an error detection result signal PC supplied from the error detection part 26 is indicative of an error being found, the interface part 21 does not output the readout data RD as the information data DAT.

The encryption part 22 produces encrypted data ED into which the write data WRD has been encrypted using, for example, an encryption key. The encryption part 22 supplies the encrypted data ED to the parity computation part 23 and the buffer 24.

The parity computation part 23 computes a parity bit as an error detection code for the write data WRD. The parity computation part 23 supplies, as a plaintext parity bit P1 to the buffer 24, wherein the parity bit is computed on the basis of the write data WRD. Furthermore, on the basis of a data block with the plaintext parity bit P1 added to the encrypted data ED, the parity computation part 23 computes a parity bit as an error detection code and supplies the resulting parity bit as an encryption parity bit P2 to the buffer 24.

The buffer 24 captures the encrypted data ED, the plaintext parity bit P1, and the encryption parity bit P2. Then, as shown in FIG. 2, the buffer 24 supplies, to the memory cell array part 10, data with the plaintext parity bit P1 and the encryption parity bit P2 added to the encrypted data ED.

Figure 2:
FIG. 2 is a diagram illustrating a format of data to be written to a memory cell array part 10.

Furthermore, the buffer 24 captures data read from the memory cell array part 10, that is, the data having the format shown in FIG. 2, and then supplies the data as readout encrypted data RED to the decryption part 25 and the error detection part 26.

The decryption part 25 performs a decryption process for canceling encryption on the encrypted data ED included in the readout encrypted data RED. The decryption part 25 supplies the data of which encryption has been canceled by the decryption process to the interface part 21 and the error detection part 26 as the readout data RD. Note that the decryption part 25 stops its own decryption operation when having received, from the memory monitoring part 27, a monitoring process execution signal EX indicative of the monitoring process being executed.

That is, during no monitoring process being executed, the decryption part 25 executes the decryption process, but stops the decryption process during the monitoring process being executed.

The error detection part 26 extracts the plaintext parity bit P1 and the encryption parity bit P2 from the readout encrypted data RED. When the monitoring process execution signal EX is indicative of no monitoring process being executed, the error detection part 26 performs a parity check (referred to as the plaintext parity check) on the readout data RD as follows. That is, the error detection part 26 computes a parity bit from the readout data RD, and then determines whether or not the logic level of the computed parity bit and the logic level of the plaintext parity bit P1 are matched. Here, when it is determined that both are matched, the error detection part 26 acquires a check result indicative of no parity error being found as a result of the plaintext parity check. On the other hand, when it is determined that both are not matched, the error detection part 26 acquires a check result indicative of a parity error being found as a result of the plaintext parity check.

When the monitoring process execution signal EX is indicative of the monitoring process being executed, the error detection part 26 performs a parity check (referred to as the encryption parity check) as follows on a data block with the plaintext parity bit P1 added to the encrypted data ED included in the readout encrypted data RED. That is, the error detection part 26 computes a parity bit from the data block with the plaintext parity bit P1 added to the encrypted data ED, and then determines whether or not the logic level of the resulting parity bit and the logic level of the encryption parity bit P2 are matched. Here, when it is determined that both are matched, the error detection part 26 acquires a check result indicative of no parity error being found as a result of the encryption parity check. On the other hand, when it is determined that both are not matched, the error detection part 26 acquires a check result indicative of a parity error being found as a result of the encryption parity check.

The error detection part 26 produces a detection result signal PC which is indicative of an error being found when the aforementioned result of the plaintext parity check indicates a parity error being found and which is indicative of no error being found when the result indicates no parity error being found. The error detection part 26 produces the detection result signal PC which is indicative of an error being found when the result of the encryption parity check indicates a parity error being found and which is indicative of no error being found when the result indicates no parity error being found.

That is, the error detection part 26 produces the error detection result signal PC on the basis of the result of the plaintext parity check or the result of the encryption parity check, and then supplies the resulting signal to the interface part 21, the memory monitoring part 27, and the memory access part 28.

The memory monitoring part 27 intermittently executes the monitoring process for monitoring the deterioration level of each block in the memory cell array part 10 immediately after power is supplied or during the period in which a readout process and a writing process are not performed in response to an access (reading or writing) from a host device. The memory monitoring part 27 supplies, to the decryption part 25, the error detection part 26, and the memory access part 28, the monitoring process execution signal EX which is indicative of the memory monitoring part 27 executing or not executing the monitoring process.

That is, first, the memory monitoring part 27 supplies, to the memory access part 28 for each block in the memory cell array part 10, the readout access signal which prompts readout of data from each page included in the block. This allows the memory access part 28 to read, from the memory cell array part 10, the data stored in the memory cell array part 10, that is, the data having the data format shown in FIG. 2. The readout data is supplied to the error detection part 26 as the readout encrypted data RED via the buffer 24 of the memory controller 20.

When the monitoring process execution signal EX is indicative of the monitoring process being executed, the error detection part 26 performs the encryption parity check on the code block with the encryption parity bit P2 added to the encrypted data ED included in the readout encrypted data RED. Then, the error detection part 26 produces the error detection result signal PC indicative of the presence or absence of an error on the basis of the result of the encryption parity check and then supplies the resulting signal to the memory monitoring part 27. The memory monitoring part 27 determines, for each block, the total count of errors being found indicated by the error detection result signal PC. Then, the memory monitoring part 27 determines the total count of errors determined for each block as the deterioration level of the block.

When it is determined that the deterioration level is greater than a predetermined threshold value, the memory monitoring part 27 makes the associated block unavailable thereafter and provides control to the memory cell array part 10 to write the data stored in this block to another block. When it is determined that the deterioration level is less than the predetermined threshold value, the memory monitoring part 27 urges the memory cell array part 10 to rewrite the data stored in the associated block to this block, that is, to execute a so-called refresh process.

Upon reception of the write access signal (including the write command and an address) from the interface part 21, the memory access part 28 supplies, to the memory cell array part 10, the address AD and a write signal indicated by the write access signal. This allows the encrypted data ED into which the information data DAT to be written has been encrypted, the plaintext parity bit P1 for error detection based on the information data DAT, and the encryption parity bit P2 for error detection based on the encrypted data ED to be written to the memory cell array part 10.

On the other hand, upon reception of the readout access signal (including the readout command and an address) from the interface part 21 or upon reception of the monitoring process execution signal EX indicative of the monitoring process being executed and the readout access signal from the memory monitoring part 27, the memory access part 28 supplies, to the memory cell array part 10, the address and the readout signal indicated by the readout access signal. This causes the memory cell array part 10 to read the encrypted data ED having the data format shown in FIG. 2, the plaintext parity bit P1, and the encryption parity bit P2. The read data (ED, P1, and P2) is supplied as the readout encrypted data RED to the decryption part 25 and the error detection part 26.

During a readout process being executed in response to a readout access from a host device, the error detection part 26 is supplied with the monitoring process execution signal EX indicative of no monitoring process being executed. Therefore, the error detection part 26 executes the aforementioned plaintext parity check and then supplies, to the memory access part 28, the error detection result signal PC indicative of the result. Upon reception of the error detection result signal PC indicative of an error being found, the memory access part 28 executes a re-readout process (to be discussed later).

A description will now be given of the error detection process that is executed in the decryption part 25 and the error detection part 26 at the time of reading data from the memory cell array part 10.

Figure 3:
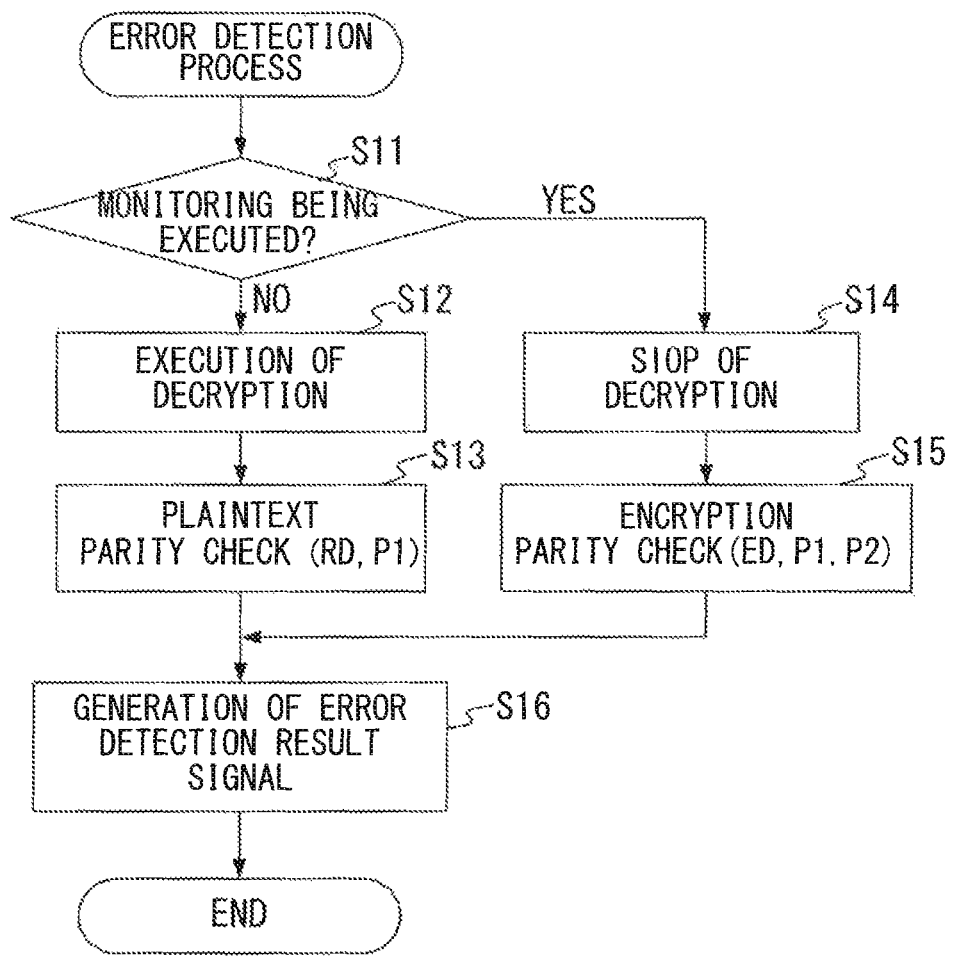
FIG. 3 is a flowchart of an error detection process.

FIG. 3 is a flowchart of the procedure of the error detection process. In FIG. 3, the decryption part 25 and the error detection part 26 first determine, on the basis of the monitoring process execution signal EX, whether or not the monitoring process is being executed (step S11).

When it is determined in step S11 that no monitoring process is being executed, the decryption part 25 executes a decryption to cancel the encryption of the encrypted data ED included in the readout encrypted data RED which has been read from the memory cell array part 10 and has the data format shown in FIG. 2 (step S12). The decryption part 25 supplies the data of which encryption has been canceled by the decryption in step S12 to the error detection part 26 as the readout data RD.

Next, the error detection part 26 computes a parity bit from the readout data RD and determines whether or not the logic level of the resulting parity bit and the logic level of the plaintext parity bit P1 are matched to thereby acquire a parity check result indicative of whether or not there is a parity error, and to this end, executes the plaintext parity check (step S13). On the other hand, when it is determined in step S11 that the monitoring process is being executed, the decryption part 25 stops the operation thereof, that is, the decryption process on the encrypted data ED (step S14).

Next, the error detection part 26 computes a parity bit from the data block with the plaintext parity bit P1 being added to the encrypted data ED included in the readout encrypted data RED and determines whether or not the logic level of the resulting parity bit and the logic level of the encryption parity bit P2 are matched. This causes the error detection part 26 to execute the encryption parity check and thereby acquire a parity check result indicative of whether or not there is a parity error (step S15).

After the execution of step S15 or S13, the error detection part 26 produces the error detection result signal PC indicative of the presence or absence of an error on the basis of the result of the aforementioned plaintext parity check or the result of the encryption parity check (step S16).

As described above, the memory controller 20 writes, to the memory cell array part 10, a data piece with the plaintext parity bit P1 and the encryption parity bit P2 added to the encrypted data ED into which information data has been encrypted. Note that the plaintext parity bit P1 is computed as the first code for error detection on the basis of the information data in a plaintext state before being encrypted. The encryption parity bit P2 is computed as the second code for error detection on the basis of the encrypted data ED.

Here, the memory controller 20 selects as below a method for a parity check to be conducted at the time of a data readout depending on whether or not the data readout is performed by following the memory monitoring process.

That is, at the time of the data readout process in response to a readout command from a host device, that is, when the monitoring process by the memory monitoring part 27 is not being executed, the memory controller 20 performs the plaintext parity check. That is, the memory controller 20 performs a parity check using the plaintext parity bit P1 included in the readout encrypted data RED on the readout data RD into which the encrypted data ED has been decrypted (S13).

On the other hand, when the monitoring process is being executed, that is, at the time of a data readout accompanying the monitoring process, the memory controller 20 performs the encryption parity check. That is, the memory controller 20 performs a parity check, using the encryption parity bit P2, on a data block with the plaintext parity bit P1 added to the encrypted data ED included in the readout encrypted data RED (S15).

As described above, since the encryption parity check eliminates the necessity of the decryption process by the decryption part 25, the memory monitoring part 27 stops the operation of the decryption part 25 during execution of its own monitoring process (S14) and determines the deterioration level of the memory corresponding to the total count of errors based on the result of the encryption parity check.

Therefore, since the amount of power consumption in the decryption part 25 is substantially zero at the time of the monitoring process of the memory, the amount of power consumption of the semiconductor storage device 100 is reduced. It is also possible in the aforementioned monitoring process to immediately perform a parity check on the data (ED, P1, and P2) read from the memory cell array part 10 without waiting for the completion of the decryption process. It is thus possible to shorten the time spent for the monitoring process.

The aforementioned embodiment employs the encryption parity check as the parity check in the monitoring process. However, even when the re-readout process is conducted in response to a readout access from the host device, the encryption parity check may also be performed in the same manner.

Note that the re-readout process is executed, during no monitoring process being executed, when the result of the plaintext parity check on the data (RD, P1) which was read from the memory cell array part 10 in response to a readout access from the host device and decrypted is indicative of an error being found. In the re-readout process, data is repeatedly read from the same address while a readout condition (for example, the voltage value of a readout voltage) is being changed until the result of a parity check indicates no error being found or the count of readings reaches a predetermined upper limit.

Figure 4:
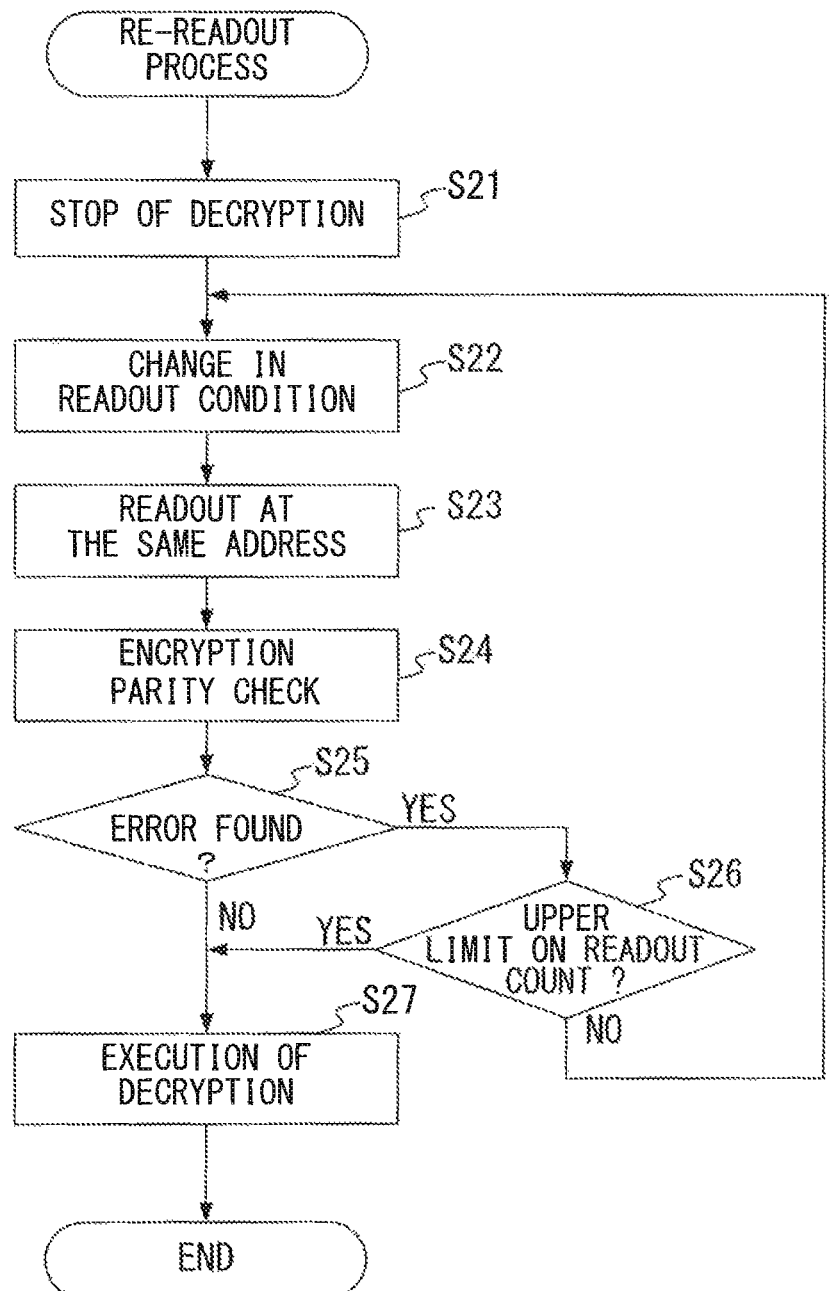
FIG. 4 is a flowchart of a re-readout process.

FIG. 4 is a flowchart of the re-readout process executed by the memory access part 28. First, the memory access part 28 stops the operation of the decryption part 25 (step S21).

Next, the memory access part 28 changes the readout condition at the current point of time in the memory cell array part 10, for example, to increase or decrease the voltage value of the readout voltage by a predetermined value (step S22). Next, the memory access part 28 performs readout control on the memory cell array part 10 to read data from the same address as that designated by the aforementioned readout access (step S23).

Next, the memory access part 28 causes the error detection part 26 to execute the encryption parity check (step S24).

Next, the memory access part 28 determines whether or not the error detection result signal PC supplied from the error detection part 26 is indicative of an error being found (step S25).

When it is determined in step S25 that the error detection result signal PC is indicative of an error being found, the memory access part 28 determines whether or not the count of re-readouts has reached a predetermined upper limit (step S26).

When it is determined in step S26 that the count of re-readouts has not yet reached the predetermined upper limit, the memory access part 28 returns to the execution of step S22 to execute again the operation of the aforementioned steps S22 to S25. That is, after the readout condition is changed (S22), the data (ED, P1, and P2) is read again from the same address (S23), and the memory access part 28 performs a parity check (the encryption parity check) using the encryption parity bit P2 on a data block with the plaintext parity bit P1 added to the read encrypted data ED (S24).

When it is determined in step S26 that the count of re-readouts has reached the predetermined upper limit or when it is determined in step S25 that the error detection result signal PC is not indicative of an error being found, the memory access part 28 restarts the decryption operation of the decryption part 25 (step S27).

As described above, in the re-readout process shown in FIG. 4, the encryption parity check is employed as a parity check that is performed on data to be repeatedly read from the memory cell array part 10. Thus, in the re-readout process shown in FIG. 4, since the decryption operation by the decryption part 25 is not required during the re-readout process being executed, the operation of the decryption part 25 is stopped during the re-readout process being executed (S21 and S27).

Since this leads to substantially zero power to be consumed in the decryption part 25 at the time of the re-readout process, the amount of power consumption by the semiconductor storage device 100 is decreased. Furthermore, in the re-readout process shown in FIG. 4, a parity check can be immediately performed on the data (ED, P2) read from the memory cell array part 10 without waiting for the completion of the decryption process in the decryption part 25. It is thus possible to shorten the time spent for the re-readout process.

Note that although the parity computation part 23 in the aforementioned embodiment computes the encryption parity bit P2 from the data block with the plaintext parity bit P1 added to the encrypted data ED, a parity bit directly computed from the encrypted data ED may also be employed as the encryption parity bit P2. At this time, in the encryption parity check, the error detection part 26 computes the parity bit from the encrypted data ED and then determines whether or not the logic level of the resulting parity bit and the logic level of the encryption parity bit P2 are matched.

Furthermore, the parity check is employed in the aforementioned embodiment as an error detection scheme for the data read from the memory cell array part 10. However, another error detection scheme such as the Cyclic Redundancy Check (CRC) may also be employed. It is also acceptable to employ an error correction code as the error detection scheme.

For example, when the CRC is employed as the error detection scheme, a CRC code computation part may be employed in place of the parity computation part 23, the CRC code computation part being configured to compute at least one-bit code for error detection by a predetermined generating polynomial according to a CRC scheme. The CRC code computation part supplies, to the buffer 24, a code computed on the basis of the write data WRD as P1 shown in FIG. 2 and a code computed on the basis of the encrypted data ED as P2. The error detection part 26 performs the computation according to the generating polynomial used in the CRC code computation part on a bit stream with the code P1 added to the readout data RD of which encryption has been canceled or a bit stream with the code P2 added to the encrypted data ED. This allows the error detection part 26 to acquire the error detection result signal PC indicative of the presence or absence of an error bit.

In summary, the memory controller (20) included in the semiconductor storage device 100 for controlling the memory (10) in response to a write command or a readout command may include a monitoring part, a memory access part, a decryption part, and an error detection part to be mentioned below.

The monitoring part (27) intermittently executes monitoring processes each for monitoring the deterioration level of a memory corresponding to the count of errors having occurred in a data piece read from the memory (10). Upon reception of a write command, the memory access part (27) writes, to the memory (10), an encrypted data piece (ED) into which an information data piece (WRD) to be written is encrypted, a first code (P1) for error detection based on the information data piece, and a second code (P2) for error detection based on the encrypted data piece. On the other hand, upon reception of the readout command or during the monitoring process being executed, the memory access part (27) reads, from the memory (10), the encrypted data piece (ED), the first code (P1), and the second code (P2).

The decryption part (25) acquires a readout data piece (RD) of which encryption has been canceled by decrypting the encrypted data piece (ED) read from the memory (10).

The error detection part (26) acquires a first error detection result by performing an error detection process on the readout data piece (RD) and the first code (P1) read from the memory (10). Furthermore, the error detection part (26) acquires a second error detection result by performing the error detection process on the encrypted data piece (ED) and the second code (P2) read from the memory (10). Here, during the monitoring process being executed, the monitoring part (27) stops the operation of the decryption part (25) and determines the deterioration level of the memory (10) on the basis of the aforementioned second error detection result.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims. This application is based upon and claims the benefit of priority from the prior Japanese Patent Application No. 2017-096462 filed on May 15, 2017, the entire contents of which are incorporated herein by reference.

What is claimed is:

1. A semiconductor storage device comprising:
    a memory; and
    a memory controller configured to control said memory in response to a write command or a readout command, wherein
    said memory controller includes:
    a monitoring part configured to intermittently execute a monitoring process for monitoring a deterioration level of said memory corresponding to a count of errors having occurred in a data piece read from said memory;
    a memory access part configured to write, to said memory upon reception of said write command, an encrypted data piece into which an information data piece to be written is encrypted, a first code for error detection based on said information data piece, and a second code for error detection based on said encrypted data piece, and to read said encrypted data piece, said first code, and said second code from said memory upon reception of said readout command or during said monitoring process being executed;

a decryption part configured to acquire a readout data piece of which encryption has been canceled by decrypting said encrypted data piece read from said memory; and an error detection part configured to acquire a first error detection result by performing an error detection process on said readout data piece and said first code read from said memory and to acquire a second error detection result by performing an error detection process on said encrypted data piece and said second code read from said memory, and said monitoring part stops operation of said decryption part during said monitoring process being executed and determines said deterioration level on a basis of said second error detection result.

2. The semiconductor storage device according to claim 1, wherein when said first error detection result is indicative of an error being found during no monitoring process being executed, said memory access part repeatedly executes a re-readout process for reading said encrypted data piece, said first code, and said second code until said second error detection result is indicative of no error being found, and said decryption part stops its own decryption operation during said re-readout process being executed.

3. The semiconductor storage device according to claim 2, comprising an interface part configured to output said readout data piece out of said memory controller when said first error detection result is indicative of no error being found.

4. The semiconductor storage device according to claim 1, wherein said first code is a parity bit computed on a basis of said information data piece, and said second code is a parity bit computed on a basis of said encrypted data piece.

5. The semiconductor storage device according to claim 1, wherein said memory access part employs, as said second code, a code for error detection based on a data block acquired by adding said first code to said encrypted data piece, and said error detection part acquires said second error detection result by performing an error detection process on said data block and said second code.

6. A memory controller configured to control a memory in response to a write command or a readout command, the memory controller comprising:

a monitoring part configured to intermittently execute a monitoring process for monitoring a deterioration level of said memory corresponding to a count of errors having occurred in a data piece read from said memory;

a memory access part configured to write, to said memory upon reception of said write command, an encrypted data piece into which an information data piece to be written is encrypted, a first code for error detection based on said information data piece, and a second code for error detection based on said encrypted data piece, and to read said encrypted data piece, said first code, and said second code from said memory upon reception of said readout command or during said monitoring process being executed;

a decryption part configured to acquire a readout data piece of which encryption has been canceled by decrypting said encrypted data piece read from said memory; and an error detection part configured to acquire a first error detection result by performing an error detection process on said readout data piece and said first code read from said memory and to acquire a second error detection result by performing an error detection process on said encrypted data piece and said second code read from said memory, wherein said monitoring part stops operation of said decryption part during said monitoring process being executed and determines said deterioration level on a basis of said second error detection result.

7. The memory controller according to claim 6, wherein when said first error detection result is indicative of an error being found during no monitoring process being executed, said memory access part repeatedly executes a re-readout process for reading said encrypted data piece, said first code, and said second code until said second error detection result is indicative of no error being found, and said decryption part stops its own decryption operation during said re-readout process being executed.

8. The memory controller according to claim 7, comprising an interface part configured to output said readout data piece out of said memory controller when said first error detection result is indicative of no error being found.

9. The memory controller according to claim 6, wherein said first code is a parity bit computed on a basis of said information data piece, and said second code is a parity bit computed on a basis of said encrypted data piece.

10. The memory controller according to claim 6, wherein said memory access part employs, as said second code, a code for error detection based on a data block acquired by adding said first code to said encrypted data piece, and said error detection part acquires said second error detection result by performing an error detection process on said data block and said second code.

11. A method for monitoring a memory, the method intermittently executing a monitoring process for monitoring a deterioration level of said memory corresponding to a count of errors having occurred in a data piece read from the memory in which an encrypted data piece into which an information data piece to be written is encrypted, a first code for error detection based on said information data piece, and a second code for error detection based on said encrypted data piece are stored, the method comprising:

reading, upon reception of a readout command or during said monitoring process being executed, said encrypted data piece, said first code, and said second code from said memory; acquiring a readout data piece of which encryption has been canceled by performing a decryption process on said encrypted data piece read from said memory;

acquiring a first error detection result by performing an error detection process on said readout data piece and said first code read from said memory; and acquiring a second error detection result by performing an error detection process on said encrypted data piece and said second code read from said memory, wherein during said monitoring process being executed, said decryption process is stopped and said deterioration level is determined on a basis of said second error detection result.

* * * * *